United States Patent
Hogg et al.

(10) Patent No.: US 10,995,529 B2
(45) Date of Patent: May 4, 2021

(54) SAFEGUARDING ARRANGEMENT

(71) Applicants: Airbus Operations GmbH, Hamburg (DE); Airbus SAS, Blagnac (DE)

(72) Inventors: Craig Hogg, Hamburg (DE); Krischan Bolle, Blagnac (FR); Thomas Sütthoff, Hamburg (DE); Daniel Hinrichs, Hamburg (DE)

(73) Assignees: AIRBUS OPERATIONS GMBH, Hamburg (DE); AIRBUS SAS, Blagnac (FR)

( * ) Notice: Subject to any disclaimer, the term of this patent is extended or adjusted under 35 U.S.C. 154(b) by 594 days.

(21) Appl. No.: 15/839,341

(22) Filed: Dec. 12, 2017

(65) Prior Publication Data

US 2018/0163444 A1    Jun. 14, 2018

(30) Foreign Application Priority Data

Dec. 12, 2016  (EP) .................................... 16203487

(51) Int. Cl.
*E05C 3/14* (2006.01)
*B64D 11/00* (2006.01)
(Continued)

(52) U.S. Cl.
CPC ................ *E05C 3/14* (2013.01); *A47B 31/06* (2013.01); *B64D 9/003* (2013.01);
(Continued)

(58) Field of Classification Search
CPC ...... E05C 3/14; Y10T 292/394; Y10T 292/34; Y10T 292/37; Y10T 292/1089; Y10T 292/444; B64D 11/04; B64D 11/0007
(Continued)

(56) References Cited

U.S. PATENT DOCUMENTS

| | | | | |
|---|---|---|---|---|
| 532,922 A | * | 1/1895 | Suetterle | E05F 11/00 292/228 |
| 1,774,236 A | * | 8/1930 | Ohnstrand | E05B 65/46 312/286 |

(Continued)

FOREIGN PATENT DOCUMENTS

| AT | 305040 B | * | 2/1973 | ......... B64D 11/0638 |
|---|---|---|---|---|
| EP | 2851492 | * | 3/2015 | |

(Continued)

OTHER PUBLICATIONS

European Search Report, dated Jun. 2, 2017, priority document.

*Primary Examiner* — Carlos Lugo
(74) *Attorney, Agent, or Firm* — Greer, Burns & Crain, Ltd.

(57) ABSTRACT

A safeguarding arrangement for restricting the movability of at least one transport container storable or stored in a support structure receptacle. The transport container may be used for transporting goods, for example, in an aircraft, and may be stowed in the aircraft's galley area as a trolley. The safeguarding arrangement has a first safeguarding installation with at least one first safeguarding arrangement. The at least one first safeguarding arrangement allows the insertion or removal of the at least one transport container into the receptacle or from the receptacle, respectively, in its open position via an opening. The safeguarding arrangement overlaps a clean measure of the opening of the receptacle, at least zonally, in a hold position, in which the at least one transport container is held against removal from the receptacle. Further, the first safeguarding arrangement is formed variably with regard to its engagement depth into the receptacle.

20 Claims, 2 Drawing Sheets

(51) Int. Cl.
  *B64D 11/04* (2006.01)
  *B64D 9/00* (2006.01)
  *A47B 31/06* (2006.01)

(52) U.S. Cl.
  CPC .......... *B64D 11/0007* (2013.01); *B64D 11/04* (2013.01); *Y10T 292/1089* (2015.04); *Y10T 292/394* (2015.04); *Y10T 292/444* (2015.04)

(58) Field of Classification Search
  USPC ......................................................... 312/333
  See application file for complete search history.

(56) References Cited

U.S. PATENT DOCUMENTS

| | | | | |
|---|---|---|---|---|
| 2,532,586 | A * | 12/1950 | Wickwire | E05C 19/18 292/288 |
| 3,437,365 | A * | 4/1969 | Zadanoff | E05C 19/188 292/202 |
| 5,490,455 | A | 2/1996 | Conti et al. | |
| 5,505,505 | A * | 4/1996 | Follows | E05B 15/0053 292/58 |
| 6,010,094 | A | 1/2000 | Csik et al. | |
| 6,149,209 | A * | 11/2000 | Barton | E05C 5/00 292/189 |
| 6,224,118 | B1 * | 5/2001 | Ashford | E05B 17/208 292/202 |
| 6,695,507 | B1 * | 2/2004 | Waguespack | B41J 29/54 292/137 |
| 6,874,825 | B1 * | 4/2005 | Rauner | E05B 65/0014 292/175 |
| 7,331,617 | B2 * | 2/2008 | Johnson | E05B 17/2019 292/202 |
| 8,152,208 | B2 * | 4/2012 | Varney | E05B 17/2038 292/198 |
| 9,328,543 | B2 * | 5/2016 | Burd | E05C 19/009 |
| 2007/0096478 | A1 * | 5/2007 | White | E05B 65/0014 292/288 |
| 2013/0257065 | A1 | 10/2013 | Burd | |
| 2014/0152027 | A1 | 6/2014 | Burd | |
| 2015/0070492 | A1 | 3/2015 | Hozumi et al. | |

FOREIGN PATENT DOCUMENTS

| | | | | |
|---|---|---|---|---|
| FR | 3070709 | A1 * | 3/2019 | ............ B64D 11/04 |
| GB | 2088467 | A * | 6/1982 | ............ E05C 3/041 |
| GB | 2153903 | * | 8/1985 | |
| GB | 2306553 | | 5/1997 | |

* cited by examiner

SAFEGUARDING ARRANGEMENT

CROSS-REFERENCES TO RELATED APPLICATIONS

This application claims the benefit of the European patent application No. 16203487.0 filed on Dec. 12, 2016, the entire disclosures of which are incorporated herein by way of reference.

BACKGROUND OF THE INVENTION

The invention relates to a safeguarding arrangement for restricting the movability of at least one transport container storable or stored in a receptacle of a support structure. The mentioned transport container may be used for the transport of goods, for example, in an aircraft.

Storage capacity for the accommodation of goods to be transported is valuable and available only on a restricted scale, especially within the pressurized cabin of a passenger aircraft. Goods being carried for the immediate consumption of the transported passengers, for example, are prepared in a so-called galley kitchen or, in short, galley (what nowadays in most cases actually means merely a warming) and then distributed at the seats. For this purpose, food and drinks are to be stored space-savingly and in a suitable way to stock up quickly and transportably, where they are accommodated in so-called trolleys, and these are, in turn, favorably stowed in the galley's area. To this, in the area of the galley at a suitable support structure, certain receptacles are provided.

The trolleys mentioned above are mobile and can, to access the goods stocked up in them, be removed from the receptacle in which they were earlier placed. With a view to the movement of the aircraft, the trolleys form dynamic loads which are accelerated under the movement in question, and which have to be kept under control mandatorily, in order to not represent an endangering to any of passengers or cabin crew or of structures of the aircraft. At least one safeguarding installation can therefore be provided at the carrying structure in the area of the galley for the respective receptacles in order to permit a trolley's removal from its receptacle only intentionally.

The safeguarding installation in question can, in turn, comprise at least one first safeguarding means, which permits, in an open position, the insertion or removal of the at least one transport container into the receptacle and from the receptacle, respectively, through an opening. On the other hand, in a hold position, in which the at least one transport container is held against removal from the receptacle, the first safeguarding means can overlap a clean measure of the opening of the receptacle, at least zonally. Thus, after being arranged in its receptacle, the transport container is secured by a transfer of the safeguarding means from the open position into the hold position, and, after a transfer in the opposite direction, ready to be removed from the receptacle.

At this, the transport containers are commonly available in two sizes, called half-size trolleys and full-size trolleys, whereas the difference in size relates to the depth of the dimensioning, which is, in turn, extending along the insertion direction into the receptacle. Dependent on producers and customers or users, among the mentioned transport containers, especially the respective half-size trolleys, they comprise slightly different dimensions, whereas it is not uncommon that two half-size trolleys, arranged behind one another, occupy a depth greater, by a small amount, than a full-size trolley. A contribution to this is made by the fact that the first trolley inserted into the receptacle is, or needs to be, secured with its own locking, which, if necessary, contributes as well to the depth dimension.

As with a configuration comprising two half-size trolleys, these trolleys have, as well, to be received entirely in the receptacle and to be secured, the receptacle has to provide the respective space, whereby, if the receptacle is supplied "only" with a full-size trolley, an oversupply of space is available which does not meet security challenges.

SUMMARY OF THE INVENTION

It is therefore an object of the present invention to provide a safeguarding arrangement for receptacles of transport containers in the pressure cabin of aircraft, which restrict the movability of a transport container stowed or arranged in the receptacle in a way that it does not undergo any substantial acceleration during flight service.

In accordance with the present invention, a new safeguarding arrangement is provided for use, particularly in aeronautical applications. According to that, it is especially proposed, to let the first safeguarding means overlap a clear measure of the opening of the receptacle in a hold position, at least zonally, and to configure the first safeguarding means variably with regard to its engagement depth into the receptacle.

Accordingly, the present invention is based on the idea of restricting the space available for the transport container for its movement along the depth extension of the receptacle, in the hold position, by a safeguarding means which is variable with regard to its engagement depth into the receptacle, in a way that the transport container is incapable of picking up speed under the accelerations exerted by the movement of the aircraft and, in this way, does not form a dynamic load. Accordingly, the safeguarding arrangement according to the invention represents a new and improved latching device.

According to a preferred embodiment, therefore, the invention provides a safeguarding arrangement comprising a first safeguarding means, which is designed to be swiveled, particularly to be swiveled continuously, between its open position and its hold position, while it is simply actuated in a basic manner by any service staff.

Through this, for example, clear end positions of the safeguarding means can be defined, which can give a visual information or feedback regarding which safe state the safeguarding means currently is in, when the respective position is captured.

In a preferred embodiment, the first safeguarding means covers a swivel range of a quarter turn of a full circle between the open position and the hold position, whereas in the mentioned positions the safeguarding means adopts horizontal or vertical positions with regard to the supporting structure, to a wall area, to the bottom, or another visually detectable structure, in which regard the position of the safeguarding means is advantageously displayable in an unequivocal manner Different configurations of the safeguarding means, for example with different swivel ranges, are possible.

According to another preferred embodiment, the first safeguarding means may be provided moveable against a blocking force, for example, being provided as a spring arrangement or a locking member, in the open position and/or in the hold position as its end positions. This may, for example, result in a support to adopt the end position in which direction the movement takes place by the mentioned force already beginning in a "middle position" while countering the opposite movement to leave the position until approaching this middle position, whereby, in total, the undesired or unwanted leave is adequately countered if the respective position is adopted deliberately, as in an over-center spring arrangement.

In another preferred embodiment of the safeguarding means according to the invention, the first safeguarding means may be provided with a handle at which it can be gripped and due to which the safeguarding means is designed to be manually guided between the open position and the hold position, such that the safeguarding means is easy to operate and, if necessary, simply securable against accidental misuse. This, in turn, allows the safe and slick handling by service personnel.

In an advantageous embodiment of the safeguarding arrangement according to the invention, the safeguarding means is formed in multiple parts and may comprise at least one first and one second holding part, which may be provided to be swiveled about a common swivel axis. At this, the second holding part may either serve for the variation of the distance of the safeguarding means to the transport container by joint arrangement with the first holding part or, in turn, itself being provided variable with regard to the engagement or penetration depth.

In a further embodiment of the safeguarding arrangement, which has a positive impact on the manageability due to the possibility of easily and safely gripping the safeguarding means, the common swivel axis eccentrically extends through the holding parts. Such an arrangement, in turn, favors a manually guided movement of the safeguarding means between the end positions mentioned earlier due to a larger lever driving the movement.

In order to favor the gripping of the safeguarding means at the holding part or parts and, at the same time, not to complicate or hinder the guidance of the safe guarding means by shapes of the holding parts deviating from one another too much, the first and second holding part of the safeguarding means of another preferred embodiment may comprise an essentially similar shape and the holding parts may mainly overlap one another in the same angular position. At this, the first and second holding part may, for example, comprise an essentially identical shape while slightly differing in their plane spatial extension such that, for example, the second holding part spatially covers the first holding part in full.

In a further embodiment of the safeguarding arrangement, the two holding parts may be provided connectable and moveable synchronously in the connected state.

Through this, the second holding part, forming, for example, the variable part of the safeguarding arrangement, may, so to speak, be connected to the first holding part on request and after that, together with the first holding part, form a variable safeguarding arrangement.

In a preferred embodiment of the safeguarding arrangement according to the invention, the second holding part may comprise on a free end, an edge, or a like portion essentially projecting along the trolley insertion direction, which portion protrudes into the receptacle while the second holding part or the coupled safeguarding means, respectively, takes its holding position. If the second holding part is coupled or connected to the first holding part and the two holding parts are jointly swiveled into the holding position, the second holding part and its edge, respectively, restrict or even entirely prevent the movability of the transport container in the receptacle. Again, it is conceivable to configure the variable edge in different ways. Similarly, different means may be provided to vary the engagement depth of the safeguarding means into the receptacle.

In a preferred embodiment, which ensures a safe handling and stowing of transport containers in their assigned receptacle, respectively, there may exist a distance between the edge of the second holding part in its holding position and a wall portion of the respective transport container facing the edge in the holding position, which distance either disappears (the clearance is reduced to zero) or falls below a certain predetermined maximum distance.

Through this, the transport container can be moved to the extent that it does not undergo any substantial acceleration, or—at most—only a marginal or ignorable acceleration, during under the movements of the aircraft. The maximum distance existing between the transport container (e.g., the full-size trolley) inserted into the receptacle to the maximum extent with its wall portion facing the holding part, and the opposite holding part in its holding position, may be predetermined to account for some millimeters, at the most, for example, 10 millimeters, so that the chosen configuration with receptacle and holding parts does not need to be requalified with regard to dynamic loads.

In a preferred embodiment of the safeguarding arrangement according to the invention, the support structure may be provided with a recess, in which the safeguarding means, especially the second holding part of the safeguarding means, may be stowable or stowed in its open position, at least in part. This is advantageous in order to have the safeguarding means at the safeguarding arrangement stowed at a reduced risk of injury and, nonetheless directly and easily accessible, if necessary, also in in the open position, in which position the receptacle stands open for insertion or removal of the transport containers.

The holding parts may, in an embodiment of the safeguarding arrangement according to the invention, which is particularly advantageous, be connectable or connected via a coupling member, the function of which is linkable or linked with the manner, in which the receptacle is supplied, especially this manner of supply may switch, or not, a switching element of the coupling member. At this, the switching function may be linked with a sort of "recognition" of the transport container's geometry, such as, if a first half-size trolley is recognized as the transport container provided, for example, with its own latching device to hold it tight in its position, the switching element may be switched and the holding parts may be decoupled via the coupling member and, after a second trolley is inserted into the receptacle, only the first holding part is moved into the holding position during a movement of the safeguarding means. Having a receptacle equipped differently, namely with a full-size trolley, an actuation of the latching device assigned to a first half-size trolley is prevented, concurrently the switching element is not switched or actuated, so that the first and the second holding part remain coupled, so as to mover together, resulting in a joint synchronous swiveling of the two holding parts while the first holding part is swiveled into the holding position. Accordingly, the full-size trolley is safely held in the receptacle.

At this, in a particularly preferred embodiment, the coupling member may cause a mechanical or other sort of coupling of the holding parts, especially the coupling member may carry out a coupling procedure of the holding parts by transferring the switching element from a release position into a locking position and vice versa, respectively. Another manner of coupling of the holding parts may be realized by magnetic switches.

According to a preferred embodiment of the safeguarding arrangement, which is arrangeable or arranged simply and functionally reliable in the area of a transport container's receptacle, the switching element may be provided with an actuating element, which is moveable, especially linearly moveable, and which is engaged with a slot provided at the second holding part while the switching element is in the release position and which is disengaged from the slot while the switching element is transferred into the locking position. In the release position, when the actuating element is engaged, the independent movement of the first holding part with respect to the second holding part is enabled. On the other hand, the two holding parts are moved synchronously coupled, if the actuating element in its locking position is disengaged from the slot and to such an extent the holding parts are coupled. The transfer of the switching element between its two positions may further be directly linked with the locking of a first half-size trolley inserted into the receptacle such that the two functions become dependent on one another.

However, this is not realized necessarily in this way. Additionally, other models or implementations of switching elements are conceivable to ensure the coupling functionality.

BRIEF DESCRIPTION OF THE DRAWINGS

For a more complete understanding of the invention and the advantages thereof, exemplary embodiments of the invention are explained in more detail in the following description with reference to the accompanying drawings, in which like reference characters designate like parts and in which in.

The accompanying drawings are included to provide a further understanding of the present disclosure and are incorporated in and constitute a part of this specification.

The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other.

It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

The same or functionally equivalent elements and devices have been put on the same reference signs in all figures provided that nothing else is indicated.

DETAILED DESCRIPTION OF THE PREFERRED EMBODIMENTS

Figure 1:
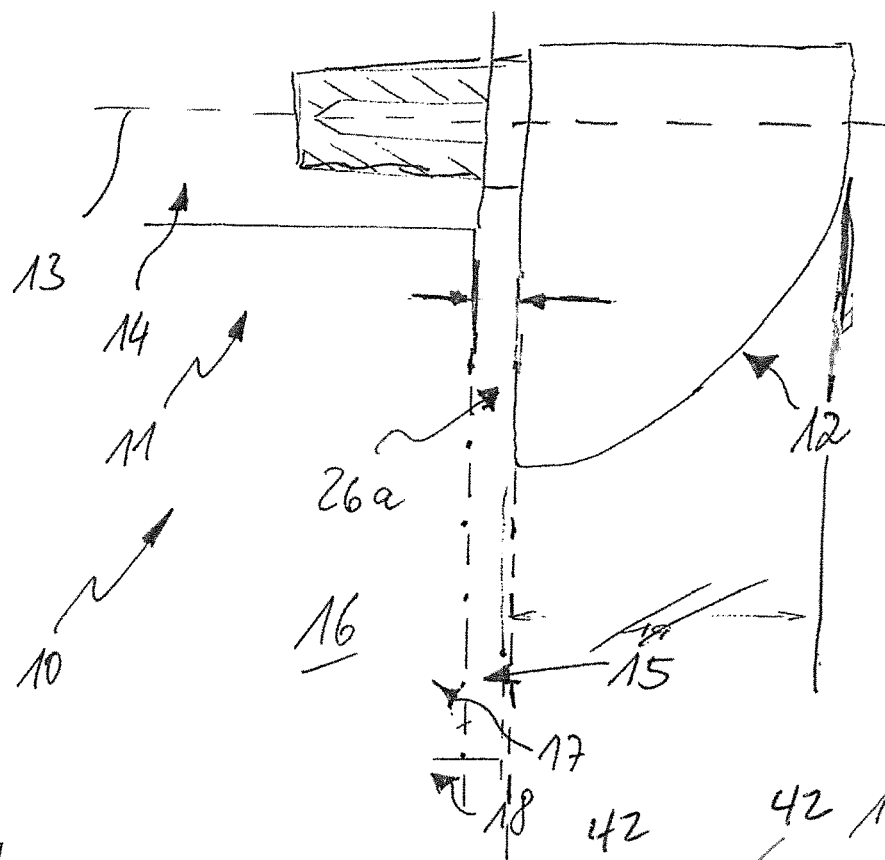
FIG. 1 is a schematic cut side view of an embodiment of a safeguarding arrangement with a safeguarding means having a first holding part, which is not provided variably with regard to the engagement depth and which correspondingly does not engage into the receptacle, whereas the receptacle is supplied with two half-size trolleys.

With reference firstly to FIG. 1 of the drawings, a safeguarding arrangement for restricting the movability of at least one transport container 17 storable or stored in a receptacle 16 of a support structure 14 is illustrated, the transport containers 17 of FIG. 1 being constituted by two half-size trolleys 18 arranged side by side in the receptacle 16 fitting flush with the support structure 14 in the area of a galley of an aircraft, not further shown here, as viewed in observation direction extending through the focal plane.

The safeguarding arrangement 10 has a safeguarding installation 11, comprising a first safeguarding means 12, the first safeguarding means 12 allows the transport containers 17 to be inserted into the receptacle 16 or to be retracted from the receptacle 16 via an opening 15, while in an open position.

Furthermore, the transport containers 17 are held in a hold position against removal from the receptacle 16 by the first safeguarding means 12, the safeguarding means 12 thereby overlaps a clean measure of the opening 15 of the receptacle 16, at least zonally, such that the safeguarding means 12 with a portion facing the "outer" of the two transport containers 17 in the hold position, shows such a small distance 26a with the transport container 17, that the two trolleys 18 are held securely in the receptacle 16. The external wall, indicated by a dashed line in FIG. 1, of the mentioned trolley 18 received in the receptacle 16 and facing the outside, fits flush with support structure 14 edging the opening 15 and just being covered by the trolley's wall in FIG. 1.

Such a configuration showing the safeguarding means 12 able to be swiveled about a swiveling axis 13 from an open position into a hold position is also known from the prior art.

Figure 2:
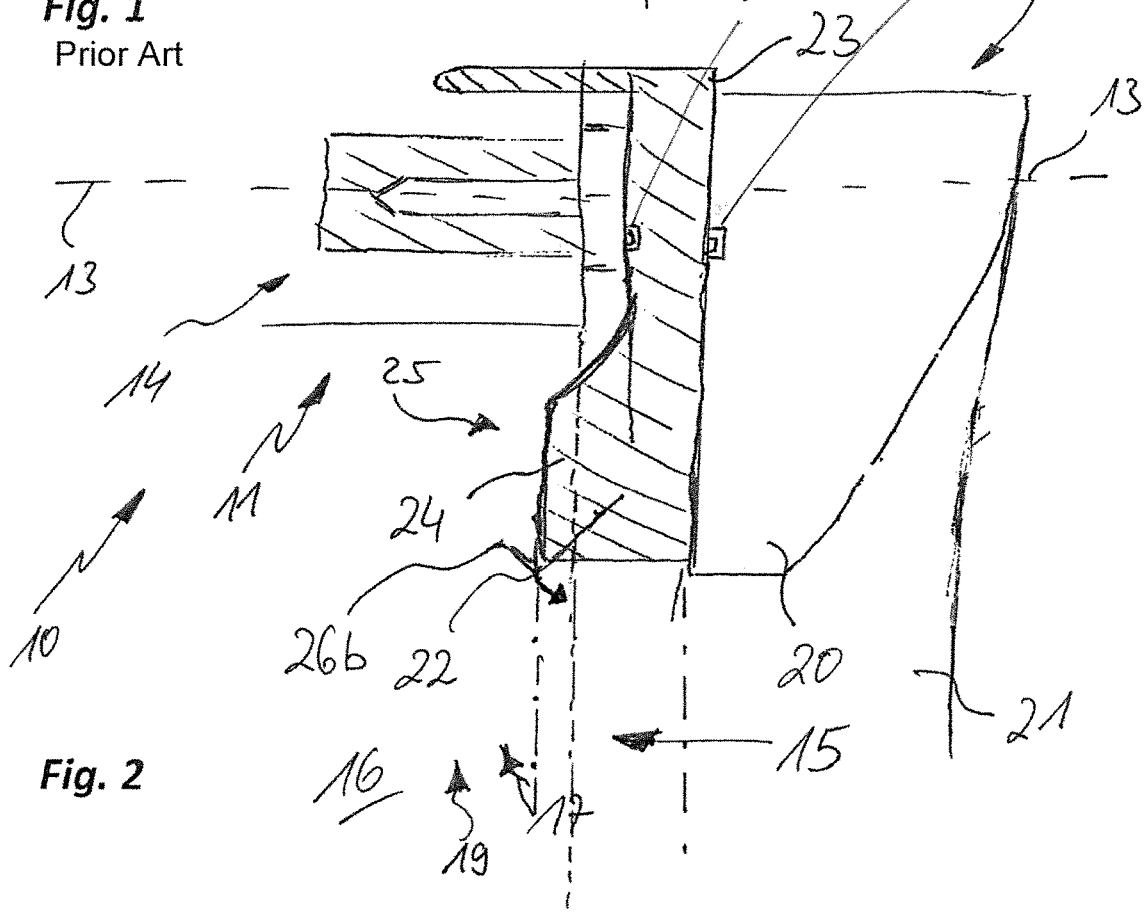
FIG. 2 is a schematic cut side view of an embodiment of a safeguarding arrangement according to the invention with a safeguarding means in a hold position, comprising a first and a second holding part and provided variably with regard to the engagement depth into the receptacle, whereas the receptacle is supplied with a full-size trolley.

Referring now to FIG. 2 of the drawings, the safeguarding means 10 according to the invention illustrated there shows structural similarity to the one shown in FIG. 1, but here, the first safeguarding means 12 is formed variable with regard to its engagement depth into the receptacle 16. The safeguarding arrangement 10 of FIG. 2 illustrates the transport container 17 in the form of a full-size trolley 19 received in the receptacle 16 and held by the safeguarding means 12 of the safeguarding arrangement 11 in the holding position.

The variability of the safeguarding means 12 shown in FIG. 2 results from its multipart configuration with a first holding part 20 and a second holding part 22. In addition, the safeguarding means is formed to be swiveled continuously between its open position and its hold position and it sweeps over a swivel range of about 90°, which means a quarter turn of a full circle. The first safeguarding means 12 may be provided moveable against a blocking force, for example, being provided as a spring arrangement 40 (FIG. 3) or a locking member 42 (FIG. 2), in the open position and/or in the hold position as its end positions. For the sake of clarity, the fact that the first safeguarding means 12 is moveable against a spring force in the end positions being constituted by the open position and the hold position cannot be seen in FIG. 2. This may, for example, result in a support to adopt the end position in which direction the movement takes place by the mentioned force already beginning in a "middle position" while countering the opposite movement to leave the position until approaching this middle position, whereby, in total, the undesired or unwanted leave is adequately countered if the respective position is adopted deliberately, as in an over-center spring arrangement 40 as shown schematically in FIG. 3.

However, one can clearly see that the first holding part 20 of the first safeguarding means 12 is, due to its shape, provided with a handle 21, at which it can be gripped and guided manually between the open position and the hold position, a fact depicted even better in FIGS. 3 and 4, described below.

Figure 3:
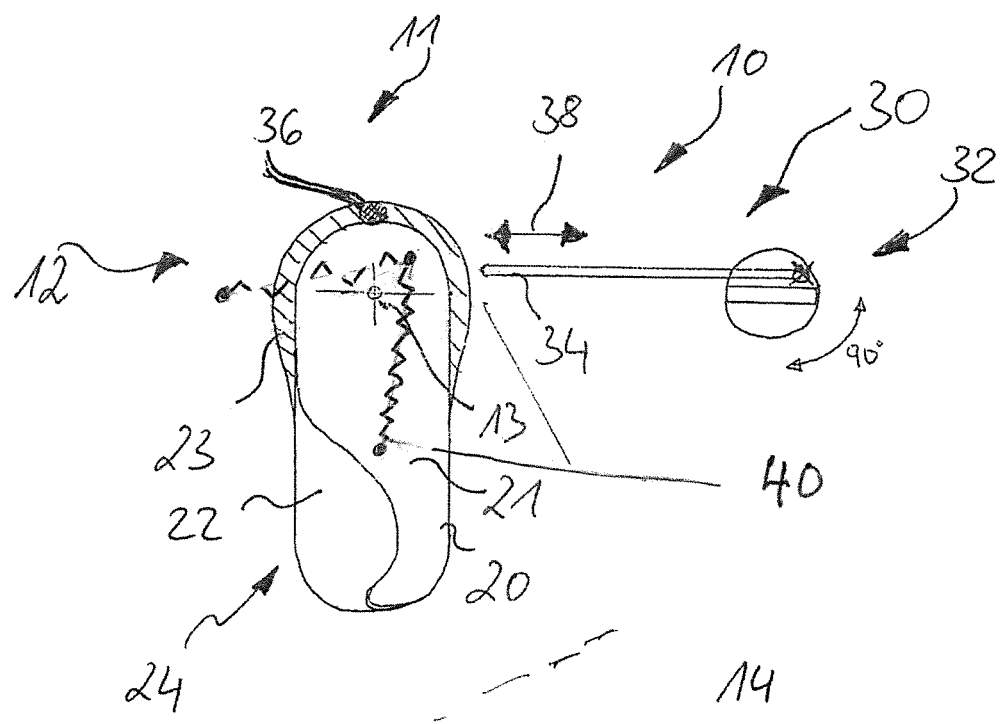
FIG. 3 is a schematic perspective plane frontal view of another embodiment of a safeguarding means of the safeguarding arrangement according to the invention taken from FIG. 2 and arranged with a supporting structure, the safeguarding means having a coupling member, the switching element of which is in the locking position.
Figure 4:
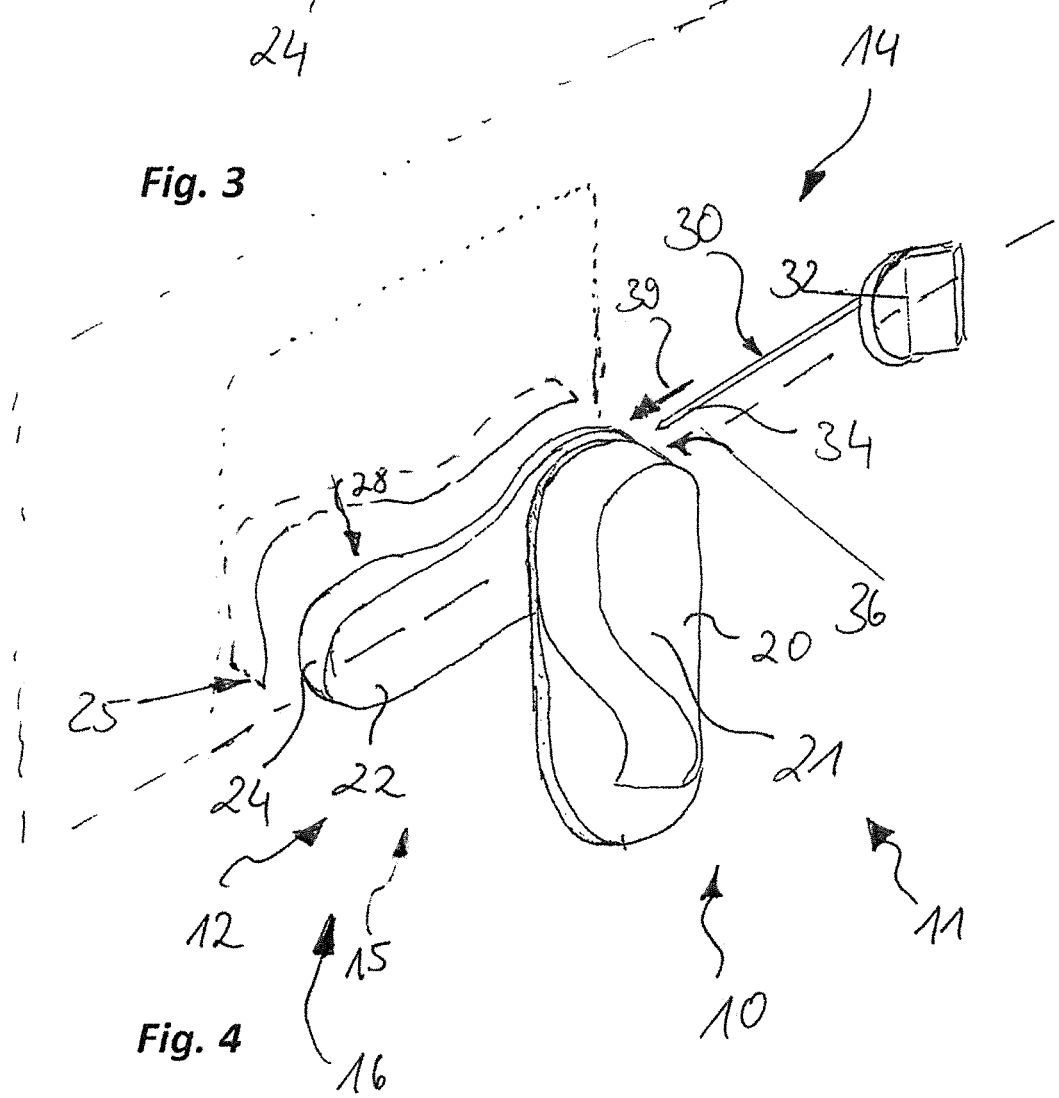
FIG. 4 is a schematic perspective view of another embodiment of a safeguarding means of the safeguarding arrangement according to the invention taken from FIGS. 2 and 3 and arranged with a supporting structure, the safeguarding means having a coupling member the switching element of which is transferred from the locking position into the release position.

Returning to the two holding parts 20, 22, one can see in FIGS. 2 to 4 that the first safeguarding means 12 is formed in a multipart manner with these holding parts 20 22, formed to be swiveled independent from one another about a common axis 13, which is represented by the swivel axis 13 mentioned before and which eccentrically extends through the holding parts 20, 22.

The two mentioned holding parts 20, 22 of the safeguarding means 12 comprise by this an essentially similar contour and cover one another in the same angular position, such that the second holding part 22 merely overlaps the first one in a partially circumferential peripheral zone 23, as arising again from FIGS. 3 and 4.

Further, it can be clearly recognized that the holding parts 20, 22 can be coupled, such as by frictional engagement, detents, and similar arrangements, that they are moveable synchronously, hence they can be swiveled. At this, the second holding part 22 comprises an edge 24 at its free end as a protruding portion, which edge projects into the receptacle 16 when the second holding part 22 and the coupled safeguarding means 12, respectively, are in the holding position, while its small distance or even its contact with the transport container 17 holds the latter in its position.

Accordingly, as can be clearly seen in FIG. 2, there exists no spacing, or a distance 26b falling below a predetermined maximum distance, between the edge 24 of the second holding part 22 in its holding position and a wall portion of the transport container 17 facing the edge 24 in the holding position.

Referring now to FIGS. 3 and 4, one recognizes that at first instance in FIG. 3, there is illustrated merely a securing installation 11 of the safeguarding arrangement 10 of FIG. 2. Firstly, one identifies the safeguarding means 12 of the safeguarding installation 10 with its two holding parts 20, 22 arranged to be swiveled jointly and synchronously and being situated jointly in the holding position, whereby the two holding parts 20, 22 are hence coupled and can be coupledly and synchronously moved, accordingly.

At this, the two holding parts 20, 22 are coupled via a coupling member 30, whose function is linked with the manner of the receptacle's 16 filling with trolleys, which additionally switches a switching element 32 of the coupling member 30. Due to insertion into the receptacle 16, which is not recognizable from FIG. 3, by a full-size trolley 19 representing the transport container 17, the switching element 32 is turned about its central axis by an amount of 90° using a mechanism not shown in detail for the sake of clarity. Thus, the switching element 32 performs a quarter turn such that the coupling member 30 provided with a bar-like actuation piece disengages from the slot 36 situated at the peripheral zone 23 of the second holding part 22. The coupling member 30 mechanically couples the holding parts 20, 22 to one another, whereas the coupling or decoupling of the holding parts 20, 22 is performed by moving of the coupling member 30 in the directions of the double arrow 38 between a release position shown in FIG. 3 and a locking position and vice versa, respectively.

The relevant locking position of the coupling member 30 may then be learned from FIG. 4, where the coupling member 30 is transferred along the direction of the arrow 39 in its locking position by the switching element 32, which has been switched in its other position turned about 90° by the insertion into the receptacle 16 of a half-size trolley 18 as the transport container 17. This, in turn, releases the coupling between the holding parts 20, 22, by which they are movable independently from one another. Through this, only the first holding part 20 moves into the holding position of the safeguarding means 12.

It can also be seen very clearly from FIG. 4 that the second holding part 22, which was not jointly moved into the holding position, comprises an edge 24 at its free end facing away from the swivel axis 13 forming a portion 25 protruding in the trolley insertion direction, which protrudes into the receptacle 16 when the second holding part 22 or the coupled safeguarding means 12, respectively, is in the holding position.

Moreover, one further recognizes a recess 28 provided with the support structure 14 in which the safeguarding means 12, especially the second holding part 22 of the safeguarding means 12, is stowable or stowed in the open position, at least partially. At this, at least the edge 24 is received in the recess 28 of the support structure 14 in the open position.

According to above explanations, the present disclosure pertains to a safeguarding arrangement 10 for restricting the movability of at least one transport container 17 storable or stored in a receptacle 16 of a support structure 14. The mentioned transport container 17 may be used for the transport of goods, for example, in an aircraft, and may be stowed in the area of the aircraft's galley as a so-called trolley 18, 19. The safeguarding arrangement 10 has a first safeguarding installation 11 with at least one first safeguarding means 12. The at least one first safeguarding means 12 allows the insertion or the removal of the at least one transport container 17 into the receptacle or from the receptacle, respectively, in its open position via an opening 15. At this, the safeguarding means 12 overlaps a clean measure of the opening 15 of the receptacle 16, at least zonally, in a hold position, in which the at least one transport container 17 is held against retraction from the receptacle 16.

Further, the first safeguarding means is formed variably with regard to its engagement depth into the receptacle 16.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way.

Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise," "comprising," "include," "including," "contain," "containing," "have," "having," and any variations thereof, are intended to be understood in an inclusive (i.e., non-exclusive) sense, such that the process, method, device, apparatus or system described herein is not limited to those features or parts or elements or steps recited but may include other elements, features, parts or steps not expressly listed or inherent to such process, method, article, or apparatus.

Furthermore, the terms "a" and "an" used herein are intended to be understood as meaning one or more unless explicitly stated otherwise. Moreover, the terms "first," "second," "third," etc. are used merely as labels, and are not intended to impose numerical requirements on or to establish a certain ranking of importance of their object.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 10 safeguarding arrangement
11 safeguarding installation
12 safeguarding means
13 swivel axis
14 support structure
16 receptacle
17 transport container
18 half-size trolley
19 full size trolley
20 first holding part
21 handle
22 second holding part
23 peripheral zone
24 edge
25 protruding portion
26a, b distance
28 recess
30 coupling member
32 switching element
34 actuation piece
36 slot
38 double arrow
39 arrow
40 over-center spring arrangement
42 locking member

The invention claimed is:

1. A safeguarding arrangement for an aircraft and for restricting the movability of differently sized transport containers independently storable or stored in a single receptacle of a support structure, of differently sized trolleys stowed in the area of a galley of the aircraft, comprising:
a safeguarding installation comprising
a safeguarding means, wherein the safeguarding means allows at least one of an insertion into the receptacle or a removal from the receptacle, respectively, of one of the transport containers in an open position, via an opening of the receptacle,
the safeguarding means overlapping a clean measure of the opening of the receptacle, at least zonally, in a hold position, in which the at least one transport container is held against removal from the receptacle, and
the safeguarding means having a first portion selectively rotatable relative to a second portion, wherein the first and second portions each comprise an engagement surface, each engagement surface defining a corresponding engagement depth, wherein, in use, a variable engagement depth in a direction towards the receptacle is provided.

2. The arrangement according to claim 1, wherein the safeguarding means is configured to be swiveled between the open position and the hold position.

3. The arrangement according to claim 2, wherein the safeguarding means is configured to be swiveled continuously.

4. The arrangement according to claim 1, wherein the safeguarding means covers a swivel range on the order of a quarter turn of a full circle between the open position and the hold position.

5. The arrangement according to claim 1, wherein the safeguarding means is provided moveable against a blocking force, in at least one of the open position or in the hold position, constituting end positions of the safeguarding means.

6. The arrangement according to claim 5, wherein the blocking force comprises a spring arrangement or a locking member.

7. The arrangement according to claim 1, wherein the safeguarding means is provided with a handle at which the safeguarding means can be gripped and due to which the safeguarding means is configured to be manually guided between the open position and the hold position.

8. The arrangement according to claim 1, wherein the safeguarding means is formed in multiple holding parts and comprises at least one first and one second holding part comprising the first and second portions, respectively, which are configured to be swiveled about a common swivel axis.

9. The arrangement according to claim 8, wherein the common swivel axis eccentrically extends through the holding parts.

10. The arrangement according to claim 8, wherein at least the first and the second holding part of the safeguarding means comprise an essentially similar shape and the holding parts mainly overlap one another while in a common angular position.

11. The arrangement according to claim 8, wherein the two holding parts are configured to be connectable and moveable synchronously in a connected state.

12. The arrangement according to claim 8, wherein the second holding part comprises on a free end, an edge portion projecting along an insertion direction of the at least one transport container, which portion protrudes into the receptacle while the second holding part or the safeguarding means, respectively, is in the hold position.

13. The arrangement according to claim 12, wherein there exists a distance between the edge portion of the second holding part in its holding position and a wall portion of the one of the transport containers facing the edge in the holding position, which distance falls in a range from zero to a predetermined maximum distance.

14. The arrangement according to claim 1, wherein the support structure is provided with a recess, in which the safeguarding means, is configured to be stowable or stowed in the open position, at least in part.

15. The arrangement according to claim 8, wherein the multiple holding parts are provided connectable or connected to each other via a coupling member, the coupling member being linkable or linked based on the size of transport container being inserted into the receptacle.

16. The arrangement according to claim 15, wherein the manner of insertion may switch, or not, a switching element of the coupling member.

17. The arrangement according to claim 16, wherein the coupling member causes a coupling of the holding parts, wherein the coupling member carries out a coupling procedure of the holding parts by transferring the switching element from a release position into a locking position and vice versa, respectively.

18. The arrangement according to claim 17, wherein the coupling member is provided with an actuating piece, which is moveable, and which is engaged with a slot provided at the second holding part while the switching element is in the release position and which is disengaged from said slot while the switching element is transferred into the locking position.

19. The arrangement according to claim 18, wherein the actuating piece is linearly moveable.

20. A safeguarding arrangement for an aircraft and for restricting the movability of differently sized transport containers independently storable or stored in a single receptacle of a support structure, of differently sized trolleys stowed in the area of a galley of the aircraft, comprising:

a safeguarding installation comprising:
 a safeguarding means, wherein the safeguarding means allows at least one of an insertion into the receptacle or a removal from the receptacle, respectively, of one of the transport containers in an open position, via an opening of the receptacle,
  the safeguarding means overlapping a clean measure of the opening of the receptacle, at least zonally, in a hold position, in which the at least one transport container is held against removal from the receptacle, and
  the safeguarding means having a first portion selectively rotatable relative to a second portion, wherein the first and second portions each comprise an engagement surface, each engagement surface defining a corresponding engagement depth, wherein, in use, a variable engagement depth in a direction towards the receptacle is provided,
wherein the safeguarding means is formed in multiple holding parts and comprises at least one first and one second holding part comprising the first and second portions, respectively, which are configured to be swiveled about a common swivel axis,
wherein the multiple holding parts are provided connectable or connected to each other via a coupling member, the coupling member being linkable or linked based on the size of transport container being inserted into the receptacle, via a switching element of the coupling member,
wherein the coupling member causes a coupling of the holding parts,
wherein the coupling member carries out a coupling procedure of the holding parts by transferring the switching element from a release position into a locking position and vice versa, respectively,
wherein the coupling member is provided with an actuating piece, which is moveable, and which is engaged with a slot provided at the second holding part while the switching element is in the release position and which is disengaged from said slot while the switching element is transferred into the locking position.

* * * * *